United States Patent
Lee et al.

(10) Patent No.: US 9,169,154 B2
(45) Date of Patent: Oct. 27, 2015

(54) METHOD OF CUTTING CHEMICALLY TOUGHENED GLASS

(71) Applicant: SAMSUNG CORNING PRECISION MATERIALS CO., LTD., Gumi-si, Gyeongsangbuk-do (KR)

(72) Inventors: Hoikwan Lee, Asan-si (KR); Youngseok Lee, Asan-si (KR); Jae Chang Lee, Asan-si (KR); Jaeho Lee, Asan-si (KR); Jihoon Lee, Asan-si (KR); Seo-Yeong Cho, Asan-si (KR); Jaemin Cha, Asan-si (KR); Ho-Sam Choi, Asan-si (KR)

(73) Assignee: CORNING PRECISION MATERIALS CO., LTD., Asan-Si, Chungcheongnam-Do (KR)

( * ) Notice: Subject to any disclaimer, the term of this patent is extended or adjusted under 35 U.S.C. 154(b) by 172 days.

(21) Appl. No.: 14/146,559

(22) Filed: Jan. 2, 2014

(65) Prior Publication Data
US 2014/0182335 A1 Jul. 3, 2014

(30) Foreign Application Priority Data
Jan. 3, 2013 (KR) ........................ 10-2013-0000420

(51) Int. Cl.
C03B 33/02 (2006.01)
C03C 21/00 (2006.01)

(52) U.S. Cl.
CPC .................................... *C03C 21/008* (2013.01)

(58) Field of Classification Search
CPC ............................. C03B 33/02; C03C 21/008
See application file for complete search history.

(56) References Cited

U.S. PATENT DOCUMENTS

2012/0064306 A1* 3/2012 Kang et al. ................... 428/192
2014/0360230 A1* 12/2014 Sklyarevich et al. ........ 65/30.14

* cited by examiner

Primary Examiner — Queenie Dehghan
(74) Attorney, Agent, or Firm — McDermott Will & Emery LLP

(57) ABSTRACT

A method of cutting chemically toughened glass which is chemically toughened in a chemical toughening process of creating compressive stress in the surface of glass by exchanging first alkali ions in the glass with second alkali ions. The method includes the steps of applying a paste on a portion of the chemically toughened glass that is to be cut, heating the paste, and cutting the chemically toughened glass along the portion on which the paste is applied. The paste contains alkali ions. The ion radius of the alkali ions in the paste is smaller than an ion radius of the second alkali ions which substitute the first ions in the chemical toughening process.

12 Claims, 1 Drawing Sheet

METHOD OF CUTTING CHEMICALLY TOUGHENED GLASS

CROSS REFERENCE TO RELATED APPLICATION

The present application claims priority from Korean Patent Application Number 10-2013-0000420 filed on Jan. 3, 2013, the entire contents of which application are incorporated herein for all purposes by this reference.

BACKGROUND OF THE INVENTION

1. Field of the Invention

The present invention relates to a method of cutting chemically toughened glass, and more particularly, to a method of cutting a piece of chemically toughened glass in which compressive stress is created in the surface of the chemically toughened glass.

2. Description of Related Art

Glass products are treated as indispensable components in a variety of technological and industrial fields involving image and optical equipment, such as monitors, cameras, video tape recorders (VTRs) and mobile phones, transportation equipment, such as vehicles, various types of tableware, construction facilities, and the like. Accordingly, glass products having a variety of physical properties that meet the requirements of respective industrial fields are manufactured and used.

In particular, recently, chemically toughened glass is widely used as cover substrates for displays including organic light-emitting displays (OLEDs), liquid crystal displays (LCDs), plasma display panels (PDPs) and field emission displays (FEDs).

Methods of toughening glass include a physical toughening method and a chemical toughening method. The physical toughening method, also referred to as air-cooled toughening, is mainly applied to the safety glass of a vehicle. The chemical toughening method is a technology that can be usefully applied to a thin glass sheet that has a complicated shape or a thickness of about 2 mm or less. The chemical toughening method exchanges alkali ions having a small ion radius (generally Na ions) that are present inside a piece of glass with alkali ions having a large ion radius (generally K ions) under predetermined conditions. A great amount of compressive stress is created in the surface of the chemically toughened glass due to the ion exchange, thereby increasing the strength and hardness of the glass.

However, the chemically toughened glass has the drawback in that, after the glass is toughened, it is substantially impossible to perform secondary machining, such as cutting or grinding, due to the compressive stress present in the surface of the chemically toughened glass. When it is attempted to cut the chemically toughened glass using a related-art diamond wheel, the glass will break into irregular fragments instead of into an intended shape due to the large compressive stress present in the surface of the glass.

Accordingly, in the related art, chemically toughened unit glass having an intended size or shape is manufactured by cutting or grinding a large piece of glass and then performing chemical toughening on the cut or ground piece of glass. However, the process of manufacturing such chemically toughened unit glass has the problem of low process efficiency and productivity.

Therefore, in order to manufacture chemically toughened glass having a variety of sizes and shapes at high process efficiency and productivity, the development of a technology for cutting the chemically toughened glass is required.

In this regard, United States Patent Application Publication No. 2012/0064306 disclosed a technology of cutting chemically toughened glass after the glass is chemically toughened. Here, the chemical toughening is performed after a shielding layer which prevents ion exchange is formed from polymers or the like at a portion to be cut. However, there are several limitation factors. That is, the shielding layer must withstand a high-temperature environment of a chemical toughening temperature, i.e. a temperature similar to the glass transition temperature, and the shielding layer must be easily removed after the chemical toughening process.

In addition, United States Patent Application Publication No. 2010/0206008 disclosed a technology of cutting chemically toughened glass using a laser. However, the use of the laser is not efficient for productivity, which is problematic.

Furthermore, United States Patent Application Publication No. 2012/0135195 disclosed a technology of cutting chemically toughened glass by forming a tensile area in the surface of the chemically toughened glass through etching or the like and then propagating cracks. In this case, however, cracks formed in the glass surface make it difficult to handle the glass during the toughening process.

The information disclosed in the Background of the Invention section is provided only for better understanding of the background of the invention, and should not be taken as an acknowledgment or any form of suggestion that this information forms a prior art that would already be known to a person skilled in the art.

Related Art Document

Patent Document 1: United States Patent Application Publication No. 2012/0064306
Patent Document 2: United States Patent Application Publication No. 2010/0206008
Patent Document 3: United States Patent Application Publication No. 2012/0135195

BRIEF SUMMARY OF THE INVENTION

Various aspects of the present invention provide a method of cutting chemically toughened glass which can prevent the chemically toughened glass from breaking while the glass is being cut and improve the reliability of products.

In an aspect of the present invention, provided is method of cutting chemically toughened glass which is chemically toughened in a chemical toughening process of creating compressive stress in the surface of glass by exchanging first alkali ions in the glass with second alkali ions. The method includes the following steps of: applying a paste on a portion of the chemically toughened glass that is to be cut; heating the paste; and cutting the chemically toughened glass along the portion on which the paste is applied. The paste contains alkali ions. The ion radius of the alkali ions in the paste is smaller than an ion radius of the second alkali ions which substitute the first ions in the chemical toughening process.

According to an embodiment of the present invention, the chemically toughening process may chemically toughen the glass by substituting Na ions in the glass with K ions, and the paste may contain at least one type of ions selected from among Li ions and Na ions. It is preferred that the Li ions and the Na ions have the form of a nitrate.

The paste may further contain K ions. It is preferred that the K ions have the form of a nitrate.

The paste may further contain ZnO.

It is preferred that the paste include, by weight, 0 to 60 parts of $NaNO_3$ and 40 to 100 parts of $LiNO_3$ (that is, the weight ratio of $NaNO_3:LiNO_3=0\sim60:40\sim100$) and ZnO. Alternatively, it is preferred that the paste include, by weight, 0 to 60 parts to $KNO_3$ and 40 to 100 parts of $NaNO_3$ (that is, the weight ratio of $KNO_3:NaNO_3=0\sim60:40\sim100$) and ZnO.

In addition, the step of heating the paste may heat the paste using a high-frequency wave.

Furthermore, the step of cutting the chemically toughened glass along the portion on which the paste is applied may cut the chemically toughened glass using a laser or a scriber.

The method may further include the step of preheating the chemically toughened glass on which the paste is applied after the step of applying the paste on the portion of the chemically toughened glass that is to be cut and before the step of heating the paste.

The step of preheating the chemically toughened glass may heat the chemically toughened glass at a temperature of 300° C. or higher.

According to embodiments of the present invention, it is possible to cut chemically toughened glass after relaxing or removing stress in the portion of the chemically toughened glass that is to be cut, thereby preventing the chemically toughened glass from deforming or breaking due to the stress which would otherwise occur during the cutting process.

In addition, it is possible to remove compressive stress in a simple method of applying a paste, thereby improving the efficiency and productivity of the process of cutting chemically toughened glass.

The methods and apparatuses of the present invention have other features and advantages which will be apparent from, or are set forth in greater detail in the accompanying drawings, which are incorporated herein, and in the following Detailed Description of the Invention, which together serve to explain certain principles of the present invention.

DETAILED DESCRIPTION OF THE INVENTION

Figure 1:
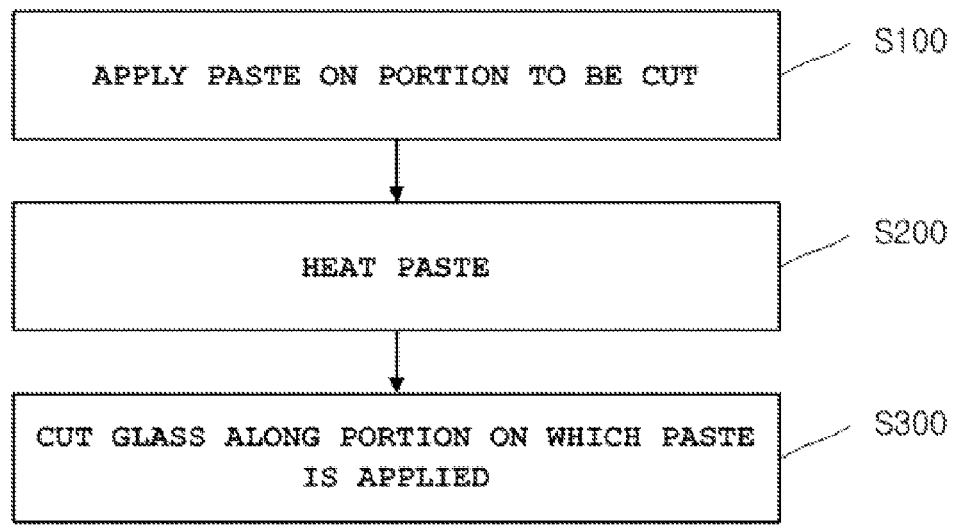
FIG. 1 is a flowchart schematically showing a method of cutting chemically toughened glass according to an embodiment of the present invention.

Reference will now be made in detail to a method of cutting chemically toughened glass according to the present invention, various embodiments of which are illustrated in the accompanying drawings and described below, so that a person having ordinary skill in the art to which the present invention relates can easily put the present invention into practice.

Throughout this document, reference should be made to the drawings, in which the same reference numerals and signs are used throughout the different drawings to designate the same or similar components. In the following description of the present invention, detailed descriptions of known functions and components incorporated herein will be omitted when they may make the subject matter of the present invention unclear.

FIG. 1 is a flowchart schematically showing a method of cutting chemically toughened glass according to an embodiment of the present invention.

Referring to FIG. 1, the method of cutting chemically toughened glass according to this embodiment includes step S100 of applying a paste on a portion of the chemically toughened glass that is to be cut, step S200 of heating the paste, and step S300 of cutting the glass along the portion on which the paste is applied.

The chemically toughened glass is manufactured in a chemically toughening process that creates compressive stress in the surface of the glass by exchanging alkali ions inside the glass with other alkali ions having a greater ion radius.

Typical chemical toughening is done by exchanging Na ions of the glass with K ions having a greater ion radius. $Mg^{2+}$ or $Ca^{2+}$ ions do not make successful chemical toughening due to ion exchange since multi-charged ions other than alkali metal have low mobility inside glass. In addition, an excessively large ion radius obstructs ion diffusion inside the glass. That is, even in single-charged ions, $Rb^+$ or $Cs^+$ ions do not make successful chemical toughening due to ion exchange.

In order to cut a piece of chemically toughened glass, first, at S100, a paste is applied on the portion of the chemically toughened glass that is to be cut.

Here, the paste contains alkali ions having a smaller ion radius than the ion radius of alkali ions that are exchanged due to the chemical toughening process.

When Na ions inside the glass are exchanged with K ions due to the chemical toughening process, the paste will contain ions of at least one of Li and Na, the ion radius of which is smaller than that of K. It is preferred that Li ions and Na ions be contained in the paste while having the form of a nitrate such as $LiNO_3$ or $NaNO_3$.

In the step of heating the paste which will be described later, Li ions diffuse into the surface of the chemically toughened glass better than Na ions since the ion radius of Li ions is smaller than the ion radius of Na ions. That is, since Li ions can diffuse faster and more deeply into the chemically toughened glass than Na ions, Li ions can increase the ion exchange speed of the chemically toughened glass and reduce the surface stress relaxation time of the chemically toughened glass.

In addition, it is possible to control the ion exchange speed and the surface stress relaxation time of the chemically toughened glass by properly adjusting the contents of Li ions and Na ions.

In addition, the paste according to an embodiment of the present invention can further contain K ions.

Adding K ions to Li ions and/or Na ions makes it possible to remove the compressive stress to a preset depth within the range in which the chemically toughened glass can be cut while allowing the compressive stress in deeper portions to remain instead of removing the entire compressive stress layer of the glass.

It is preferred that K ions be added as a nitrate to the paste.

In addition, the paste according to an embodiment of the present invention can further contain ZnO.

When applied with heat, the paste may be liquefied and flow to portions other than the portion to be cut. However, ZnO added to the paste can maintain the paste as slurry even when the paste is heated.

It is preferred that the paste according to an embodiment of the invention can include, by weight, 0 to 60 parts of $NaNO_3$ and 40 to 100 parts of $LiNO_3$ (that is, the weight ratio of $NaNO_3:LiNO_3=0\sim60:40\sim100$) and ZnO, or 0 to 60 parts of $KNO_3$ and 40 to 100 parts of $NaNO_3$ (that is, the weight ratio of $KNO_3:NaNO_3=0\sim60:40\sim100$) and ZnO.

Afterwards, at S200, the paste applied on the portion to be cut is heated.

When the paste is heated, ions in the paste are exchanged with ions in the chemically toughened glass, thereby removing or relaxing the compressive stress in the surface of the glass. That is, as alkali ions contained in the paste, the ion radius of which is smaller than the ion radius of alkali ions of the chemically toughened glass which are exchanged through the chemically toughening process, undergo ion exchange while diffusing into the chemically toughened glass, the compressive stress created in the surface of the chemically toughened glass is removed or relaxed.

Figure 2:
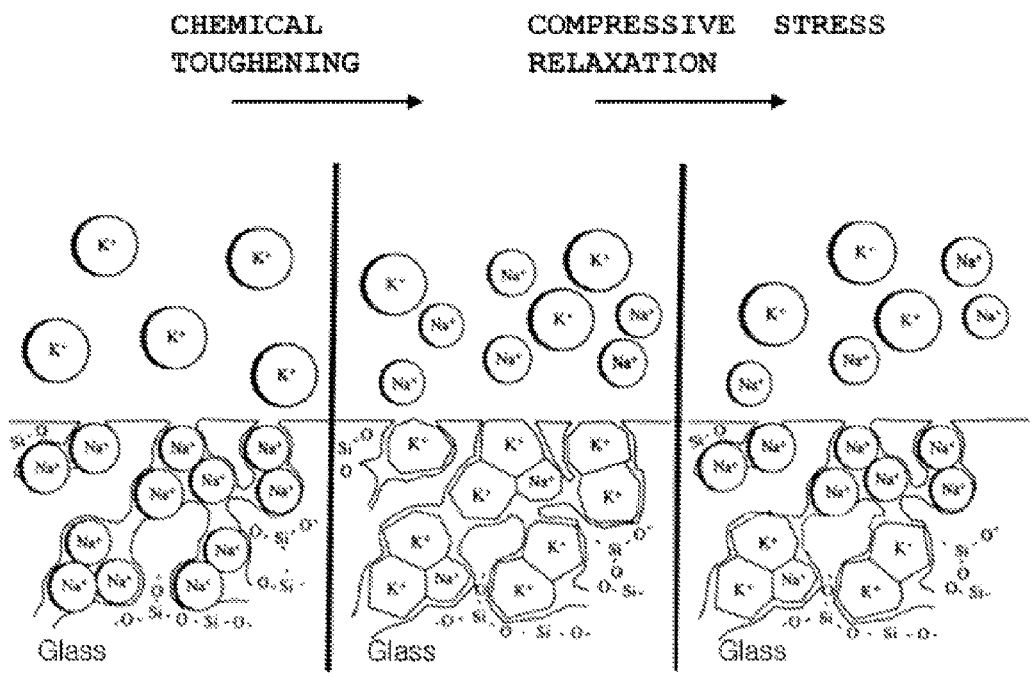
FIG. 2 is a conceptual view showing the principle of chemical toughening and compressive stress relaxation according to the present invention.

FIG. 2 is a conceptual view showing the principle of chemical toughening and compressive stress relaxation according to the present invention.

As shown in FIG. 2, in the case of chemically toughening glass, K ions diffuse into the surface of the glass through ion exchange with Na ions inside the glass, thereby creating compressive stress in the surface of the glass. When the chemically toughened glass is subjected to reverse ion exchange with Na ions, the compressive stress created in the surface of the chemically toughened glass is relaxed.

Preferably, heat that is supplied to the paste applied on the portion to be cut can be realized by dielectric heating.

In particular, when the paste contains a nitrate that excellently absorbs high-frequency energy, the temperature of the portion to be cut on which the paste is applied can be made higher than the temperature of the other portions. This consequently minimizes that high-frequency heating relaxes the compressive stress in the portions other than the portion to be cut.

Finally, at S300, the chemically toughened glass is cut along the portion to be cut.

Since cutting is performed after the compressive stress in the portion to be cut is removed or relaxed by heating the paste, the chemically toughened glass can be cut without breaking the glass.

While it is possible to cut the portion to be cut using a laser or a scriber, cutting can be performed in a variety of methods, for example, using a water jet.

In addition, the method of cutting chemically toughened glass according to an embodiment of the invention can further include a step of preheating the chemically toughened glass on which the paste is applied after the step S100 of applying the paste on the portion to be cut and before the step S200 of heating the paste.

When the chemically toughened glass is preheated before reverse ion exchange due to the heating of the paste, the ion exchange between ions of the paste and ions of the chemically toughened glass can be activated.

It is preferred that the step of preheating the chemically toughened glass on which the paste is applied can heat the glass to a temperature of 300° C. or higher using an electric heating furnace.

The present invention will be described in more detail in relation to examples. It should be understood, however, that the examples are provided for illustrative purposes and do not limit the present invention.

EXAMPLE 1

A piece of chemically toughened glass in which Na ions were exchanged with K ions was prepared, a paste including $NaNO_3$ and ZnO was applied on a portion of the chemically toughened glass to be cut, and the chemically toughened glass was heated to 330° C. through high-frequency heating. The compressive stress and the depth (DOL) of the compressive stress layer of the resultant glass were measured, and results are presented in Table 1.

TABLE 1

| HFR[1] condition | | Stress at cut portion[2] | Stress at other portion[3] | Variation | Remarks (Stress before HFR) |
|---|---|---|---|---|---|
| 100% Mgt (Atmospheric temperature: 330° C.) | 3 mins | 57.6 Mpa 33.9~34.7 μm | 716~752 Mpa 37~43 μm | 7~8% Reduced 3~6% Increased | 770~820 Mpa 35.8~40.7 μm |
| | 5 mins | Unmeasurable (Almost removed) | 589~703 Mpa 37.4~43.5 μm | 14~23% Reduced 4.5~7% Increased | |
| | 7 mins | 0 | 517~573 Mpa 38.4~46.1 μm | 30~33% Reduced 7~13% Increased | |

Note)
HFR[1]: high-frequency radiation
cut portion[2]: portion to be cut
other portion[3]: portion other than portion to be cut As presented in Table 1, it can be appreciated that, when the paste including $NaNO_3$ and ZnO was heated using a high-frequency wave, the compressive stress in the portion to be cut on which the paste was applied was completely removed within several minutes through reverse ion exchange between K ions and Na ions.

In addition, the compressive stress in the portions other than the portion to be cut on which the paste is not applied is slightly relaxed due to the high-frequency heating. Since the compressive stress of the portions other than the portion to be cut can be relaxed through the high-frequency heating and thus the strength of the chemically toughened glass can be reduced, it is necessary to properly control the high-frequency heating time. Variations in Table 1 were obtained by comparing the compressive stress of the chemically toughened glass and the depth of the compressive stress layer before the high-frequency heating with the compressive stress of the chemically toughened glass and the depth of the compressive stress layer after the high-frequency heating.

EXAMPLE 2

A piece of chemically toughened glass in which Na ions were exchanged with K ions was prepared, a paste including $KNO_3$, $NaNO_3$ and ZnO was applied on a portion of the chemically toughened glass to be cut, and the chemically toughened glass was heated to 330° C. through high-frequency heating. The compressive stress and the depth (DOL) of the compressive stress layer of the resultant glass were measured, and results are presented in Table 2.

TABLE 2

| HFR[1] condition | Stress at cut portion[2] | Stress at other portion[3] | Variation | Remarks (Stress before HFR) |
|---|---|---|---|---|
| 100% Mgt (Atmospheric temperature: 330° C.) | 3 mins Unmeasurable (estimated to be 100 MPa or less) | — | — | 770~820 Mpa 35.8~40.7 μm |
| | 5 mins | 661 Mpa 40.6~44.8 μm | 17% Reduced 10~12% Increased | |
| | 7 mins | 556 Mpa 40.8~44.8 μm | 30% Reduced 10~12% Increased | |

Note)
HFR[1]: high-frequency radiation
cut portion[2]: portion to be cut
other portion[3]: portion other than portion to be cut As presented in Table 2 above, it can be appreciated that, when the paste including $KNO_3$, $NaNO_3$ and ZnO was heated using high-frequency, the compressive stress in the portion to be cut on which the paste was applied was reduced to be 100 MPa or less within several minutes through reverse ion exchange between K ions and Na ions and localized heating of the portion to be cut due to high-frequency absorption by $KNO_3$ salt.

It can also be appreciated that the compressive stress in the portions other than the portion to be cut on which the paste is not applied is slightly relaxed due to the high frequency heating. Variations in Table 2 were obtained by comparing the compressive stress of the chemically toughened glass and the depth of the compressive stress layer before the high frequency heating with the compressive stress of the chemically toughened glass and the depth of the compressive stress layer after the high frequency heating.

EXAMPLE 3

A piece of chemically toughened glass in which Na ions were exchanged with K ions was prepared, a paste including $NaNO_3$ and ZnO was applied on a portion of the chemically toughened glass to be cut, and the chemically toughened glass was subjected to resistance heating in an electric heating furnace. The compressive stress and the depth (DOL) of the compressive stress layer of the resultant glass depending on heating temperature and heating time were measured, and results are presented in Table 3.

TABLE 3

| | | Portion to be cut | | Portion other than portion to be cut | |
|---|---|---|---|---|---|
| | | Stress | DOL | Stress | DOL |
| 330° C. | 10 mins | 747.7 MPa | 37.0~41.2 μm | 779.5 MPa | 38.3~42.5 μm |
| 330° C. | 20 mins | 198.1 MPa | 38.1~42.5 μm | 746.7 MPa | 38.8~42.9 μm |
| 330° C. | 30 mins | 166.2 MPa | 37.3~41.2 μm | 787.4 MPa | 36.3~40.4 μm |
| 350° C. | 10 mins | 285.5 MPa | 36.4~38.1 μm | 781.4 MPa | 36.3~40.4 μm |
| 350° C. | 20 mins | 264.1 MPa | 36.2~38.1 μm | 787.4 MPa | 38.5~42.8 μm |
| 350° C. | 30 mins | 173.3 MPa | 36.6~38.1 μm | 718.6 MPa | 36.9~40.7 μm |
| 400° C. | 10 mins | 200.4 MPa | 37.4~39.2 μm | 707.0 MPa | 38.4~42.5 μm |
| 400° C. | 20 mins | 131.3 MPa | 38.4~40.0 μm | 640.6 MPa | 40.6~44.7 μm |
| 400° C. | 30 mins | 112.2 MPa | 38.4~39.9 μm | 656.9 MPa | 41.3~45.7 μm |

As presented in Table 3, it can be appreciated that the compressive stress of the portion to be cut was more relaxed with the increasing temperature and time due to the heating by the electric heating furnace. In particular, it can be appreciated that the compressive stress was reduced to ⅓ to ⅕ when heated 20 minutes or more at a temperature of 330° C.

In the meantime, when Example 1 is compared with Example 3, it is apparent that the efficiency of relaxing the compressive stress of the chemically toughened glass through the high-frequency heating is better than the efficiency of relaxing the compressive stress of the chemically toughened glass through the heating using the electric heating furnace. In contrast, the ratio at which the compressive stress of the portions other than the portion to be cut was relaxed through the heating using the electric heating furnace is smaller than the ratio at which the compressive stress of the portions other than the portion to be cut was relaxed through the high-frequency heating. When the compressive stress of the chemically toughened glass is relaxed by heating the glass using the electric heating furnace, the chemically toughened glass can maintain superior toughened characteristics after being cut.

The foregoing descriptions of specific exemplary embodiments of the present invention have been presented with respect to the drawings. They are not intended to be exhaustive or to limit the present invention to the precise forms disclosed, and obviously many modifications and variations are possible for a person having ordinary skill in the art in light of the above teachings.

It is intended therefore that the scope of the present invention not be limited to the foregoing embodiments, but be defined by the Claims appended hereto and their equivalents.

What is claimed is:

1. A method of cutting chemically toughened glass which is chemically toughened in a chemical toughening process of creating compressive stress in a surface of glass by exchanging first alkali ions in the glass with second alkali ions which is different from the first alkali ions, the method comprising:

applying a paste on a portion of the chemically toughened glass that is to be cut;
heating the paste; and
cutting the chemically toughened glass along the portion on which the paste is applied,
wherein the paste comprises third alkali ions, an ion radius of the third alkali ions in the paste being smaller than an ion radius of the second alkali ions which substitute the first ions in the chemical toughening process.

2. The method according to claim 1, wherein the first alkali ions comprise Na ions, the second alkali ions comprise K ions, and the third alkali ions comprise at least one of Li ions and Na ions.

3. The method according to claim 2, wherein the paste comprises the at least one of Li ions and Na ions in a form of a nitrate.

4. The method according to claim 2, wherein the paste further comprises K ions.

5. The method according to claim 4, wherein the paste comprises the K ions in a form of a nitrate.

6. The method according to claim 2, wherein the paste further comprises ZnO.

7. The method according to claim 6, wherein the paste comprises the Li ions in a form of $LiNO_3$ and the Na ions in a form of $NaNO_3$, and
the paste comprises 0 to 60 parts by weight of $NaNO_3$ and 40 to 100 parts by weight of $LiNO_3$.

8. The method according to claim 6, wherein the paste further comprises K ions in a form of $KNO_3$,
and the paste comprises the Na ions in a form of $NaNO_3$, and
the paste comprises 0 to 60 parts by weight to $KNO_3$, 40 to 100 parts by weight of $NaNO_3$.

9. The method according to claim 1, wherein heating the paste comprises heating the paste using a high-frequency wave.

10. The method according to claim 1, wherein cutting the chemically toughened glass along the portion on which the paste is applied comprises cutting the chemically toughened glass using a laser or a scriber.

11. The method according to claim 1, further comprising preheating the chemically toughened glass on which the paste is applied after applying the paste on the portion of the chemically toughened glass that is to be cut and before heating the paste.

12. The method according to claim 11, wherein preheating the chemically toughened glass comprises heating the chemically toughened glass at a temperature of 300° C. or higher.

* * * * *